US006990192B1

(12) United States Patent
Denovich et al.

(10) Patent No.: US 6,990,192 B1
(45) Date of Patent: Jan. 24, 2006

(54) COMBINATION TELEPHONE NETWORK INTERFACE DEVICE AND CABLE TV SPLITTER

(75) Inventors: Sam Denovich, Harrisburg, PA (US); James W. Robertson, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 540 days.

(21) Appl. No.: 09/710,025

(22) Filed: Nov. 9, 2000

(51) Int. Cl.
*H04M 1/00* (2006.01)
*H04M 9/00* (2006.01)
*H04M 7/04* (2006.01)

(52) U.S. Cl. .......................... 379/399.01; 379/412.02; 379/412.03; 379/397; 379/326

(58) Field of Classification Search .......... 379/399.01, 379/412, 376, 397; 439/578, 579, 580, 581, 439/582, 583, 498, 92; 361/602, 823, 826, 361/827, 282
See application file for complete search history.

(56) References Cited

U.S. PATENT DOCUMENTS

| | | | | |
|---|---|---|---|---|
| 4,800,588 A | * | 1/1989 | Poster, Jr. .................. 379/412 |
| 4,979,209 A | | 12/1990 | Collins et al. |
| 5,394,466 A | * | 2/1995 | Schneider et al. ..... 379/413.03 |
| 5,515,435 A | * | 5/1996 | DeBalko et al. ....... 379/413.03 |
| 5,528,684 A | * | 6/1996 | Schneider et al. ..... 379/413.03 |
| 5,572,348 A | * | 11/1996 | Carlson et al. ............... 398/71 |
| 5,583,931 A | * | 12/1996 | Schneider et al. ..... 379/413.03 |
| 5,583,932 A | * | 12/1996 | Schneider et al. ..... 379/413.03 |
| 5,600,717 A | * | 2/1997 | Schneider et al. ..... 379/413.03 |
| 5,606,606 A | * | 2/1997 | Schneider et al. ..... 379/413.03 |
| 5,623,542 A | * | 4/1997 | Schneider et al. ..... 379/413.03 |
| 5,703,944 A | * | 12/1997 | DeBalko ................ 379/413.03 |
| 5,721,396 A | | 2/1998 | Daoud |
| 6,002,570 A | * | 12/1999 | Meyerhoefer et al. ...... 361/111 |
| 6,018,452 A | * | 1/2000 | Meyerhoefer et al. ...... 361/111 |
| 6,081,169 A | * | 6/2000 | Romerein et al. .......... 333/100 |
| 6,205,138 B1 | * | 3/2001 | Nihal et al. ................. 370/388 |
| RE37,125 E | * | 4/2001 | Carlson et al. ............. 398/141 |
| 6,307,933 B1 | * | 10/2001 | Stehlin et al. ......... 379/413.03 |
| 6,444,906 B1 | * | 9/2002 | Lewis ......................... 174/53 |
| 6,492,594 B1 | * | 12/2002 | Magyar et al. ............... 174/97 |
| 6,795,552 B1 | * | 9/2004 | Stanush et al. ........ 379/413.01 |

\* cited by examiner

*Primary Examiner*—Binh K. Tieu

(57) ABSTRACT

A telephone and cable television network interface device includes a first housing having first and second compartments, a terminal located in the first compartment for connection to telephone service, a terminal, located in the second compartment for connection to a telephone of a telephone service subscriber, a cover for restricting access to the first compartment and a cable television splitter. The splitter is located in the first housing and includes a second housing spanning the first and second compartments. A plurality of coaxial cable connectors, all facing the same direction, are located in the second housing. At least one connector is located in each of the compartments. The first housing includes a plurality of grooves aligned with the coaxial cable connectors. In one embodiment, the longitudinal axis of each of the coaxial cable connectors is located in the same plane. The device may also include a ground bus located in the first housing. The cable television splitter includes a mounting tab securing the splitter to the ground bus.

17 Claims, 2 Drawing Sheets

COMBINATION TELEPHONE NETWORK INTERFACE DEVICE AND CABLE TV SPLITTER

BACKGROUND OF THE INVENTION

The present invention relates to a combined telephone network interface device and cable TV splitter.

Various network interface devices are known in the art. Such devices typically include an enclosed housing located outside the home of a telephone and/or cable television subscriber. Connectors are provided on one side of the housing for incoming telephone and cable television service. On the other side of the housing, connectors are provided for individual phone and cable television hookups for telephone and cable television subscribers. Typically, the side containing the connectors for incoming service includes a cover which can be locked to prevent access to that side by anyone other than the telephone and cable television company. The other side of the housing is typically accessible by the subscriber. Examples of such devices are shown in U.S. Pat. No. 5,632,542, U.S. Pat. No. 5,583,931 and U.S. Pat. No. 5,600,717, all to Schneider, et al.

According to one embodiment of the present invention a telephone and cable television network interface device includes a first housing having first and second compartments, a terminal located in the first compartment for connection to telephone service, a terminal located in the second compartment for connection to a telephone of a telephone service subscriber, a cover for restricting access to the first compartment and a cable television splitter. The splitter is located in the first housing and includes a second housing spanning the first and second compartments. A plurality of coaxial cable connectors, all facing the same direction, are located in the second housing. At least one connector is located in each of the compartments. The first housing includes a plurality of grooves aligned with the coaxial cable connectors. In one embodiment, the longitudinal axis of each of the coaxial cable connectors is located in the same plane. The device may also include a ground bus located in the first housing. The cable television splitter includes a mounting tab securing the splitter to the ground bus.

In another embodiment of the present invention, a telephone and cable television network interface device includes a first housing having first and second compartments, a first terminal located in the first compartment for connection to telephone service, a second terminal located in the second compartment for connection to a telephone, a cover for restricting access to the first compartment and a cable television splitter located in the first housing. The splitter includes a second housing having a first portion located in the first compartment and a second portion located in the second compartment. At least one coaxial cable connector is located in the first portion of the second housing. A plurality of second coaxial cable connectors is located in the second portion of the second housing. Each of the connectors has a longitudinal axis, all of which are parallel.

In another embodiment of the invention, a telephone and cable television network interface device includes a first housing having first and second compartments, a terminal located in the first compartment for connection to telephone service, a terminal located in the second compartment for connection to a telephone and a cover for restricting access to the first compartment. The first housing further includes an opening defining a plane. The device further includes a cable television splitter located in the first housing, the splitter having a second housing spanning the first and second compartments. At least one coaxial cable connector is located in the second housing and in the first compartment. A plurality of second coaxial cable connectors are located in the second housing and in the second compartment. Each of the coaxial cable connectors has a longitudinal axis perpendicular to the plane defined by the opening in the first housing.

These and other features of the invention will become more apparent and the invention will be better understood upon reference to the following description of the invention in conjunction with the accompanying drawings.

BRIEF DESCRIPTION OF THE DRAWINGS

FIG. 3 is a front elevational view of the cable TV splitter that is a component of the device shown in FIG. 1.

FIG. 4 is a top plan view of the cable TV splitter shown in FIG. 3.

DETAILED DESCRIPTION OF EMBODIMENTS

The embodiments of the invention described herein are not intended to be exhaustive or to limit the invention to the precise forms disclosed. Rather, the embodiments selected for description have been chosen to enable one skilled in the art to practice the invention.

Figure 1:
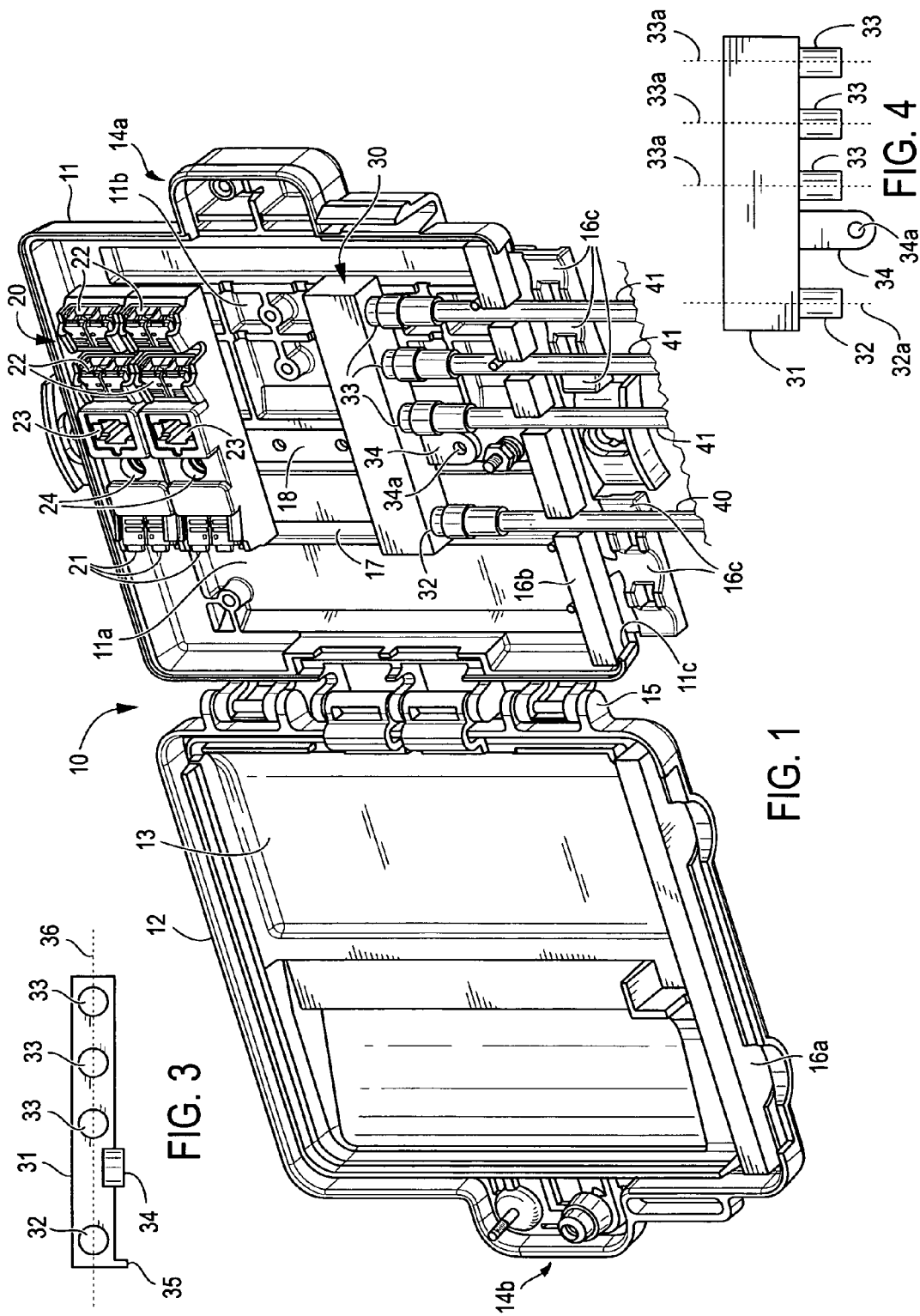
FIG. 1 is a perspective view of a combination network interface device and cable television splitter according to one embodiment of the present invention.

FIG. 1 is a perspective view of a combination network interface device and cable TV splitter according to one embodiment of the present invention. The device generally includes housing 10, telephone terminal module 20 and splitter 30.

Housing 10 generally includes a first housing portion 11, a first cover 12, a second cover 13, and a first latch including portions 14a and 14b. First housing portion 11 includes a first compartment 11a, a second compartment 11b, and an opening 11c. First cover 12 and second cover 13 are secured to first housing portion 11 by a hinge 15. Housing 10 further includes a first gasket portion 16a located in cover 12 and a second gasket portion 16b located in first housing portion 11. First housing portion 11 further includes a groove 17 and a ground strip or bus bar 18. First housing portion 11 includes a plurality of grooves 16c located adjacent gasket portion 16b. Second cover 13 includes openings 17a to accommodate cables 40.

Module 20 generally includes a first set of terminals 21, a second set of terminals 22, a third set of terminal 23, and mounting opening 24. Terminals 21 are connected to incoming telephone service. Terminals 22 are connected to the telephone subscribers' telephones. Terminals 23 are used for testing. Openings 24 are used to mount module 20 to housing 11 by inserting a fastener therethrough.

Cable TV splitter 30 includes a housing 31, a first coaxial cable connector 32 located at one end of housing 31, a plurality of coaxial cable connectors 33 extending from the same side of housing 31 as coaxial cable connector 32, a mounting tab 34 including an opening 34a therein and a projection 35 extending from housing 31. Note that each coaxial cable connector 32 and 33 includes a longitudinal axis 32a, 33a, respectively. Axes 32a and 33a lie in a common plane 36, as shown in FIG. 3. Additionally, axes 32a and 33a are parallel, as shown in FIG. 4. Note that the splitter 30 can be used for cable television service, connection to data lines and other uses. The term "splitter" or "cable TV splitter," as used in this application, is intended to cover splitters for performing any and all of these various functions.

In use, cable TV splitter 30 is placed in first housing portion 11 such that projection 35 engages groove 17. Mounting tab 34 is positioned on bus bar 18 and secured thereto by inserting a screw or similar fastener through opening 34a. In this manner, cable TV splitter 30 is grounded to bus bar 18. When installed in first housing portion 11 in this manner, housing 31 of cable TV splitter 30 spans first compartment 11a and second compartment 11b. Coaxial cable connector 32 is located in first compartment 11a and the remaining coaxial cable connectors 33 are located in second compartment 11b. In this position, coaxial cable connectors 32 and 33 are aligned with grooves 16c in first housing portion 11. Cables 40 and 41 may be secured to first housing portion 11 by wrapping a cable tie or similar device around cables 40 and 41. This provides strain relief for cables 40 and 41. Gasket portions 16a and 16b seal opening 11c in housing 10 when first cover 12 is closed. Incoming cable television service is provided by connecting a first cable 40 to coaxial cable connector 32. Outgoing service to subscribers' televisions is provided by connecting additional cables 41 to coaxial cable connectors 33. Note that in this embodiment, connectors 32 and 33 are positioned in first housing portion 11 such that (1) axes 32a and 33a are parallel, (2) axes 32a and 33a all lie in the same plane 36, and (3) axes 32a and 33a are perpendicular to the plane defined by opening 11c in first housing portion 11. Note that the combined network interface device and cable TV splitter of the present invention allows cables 40 and 41 to extend directly into first housing portion 11 and connect to coaxial cable connectors 32 and 33 without being bent or otherwise displaced. This arrangement of coaxial cable connectors 32 and 33 allows cables 40 and 41 to all enter and exit the device from the same side.

Figure 2:
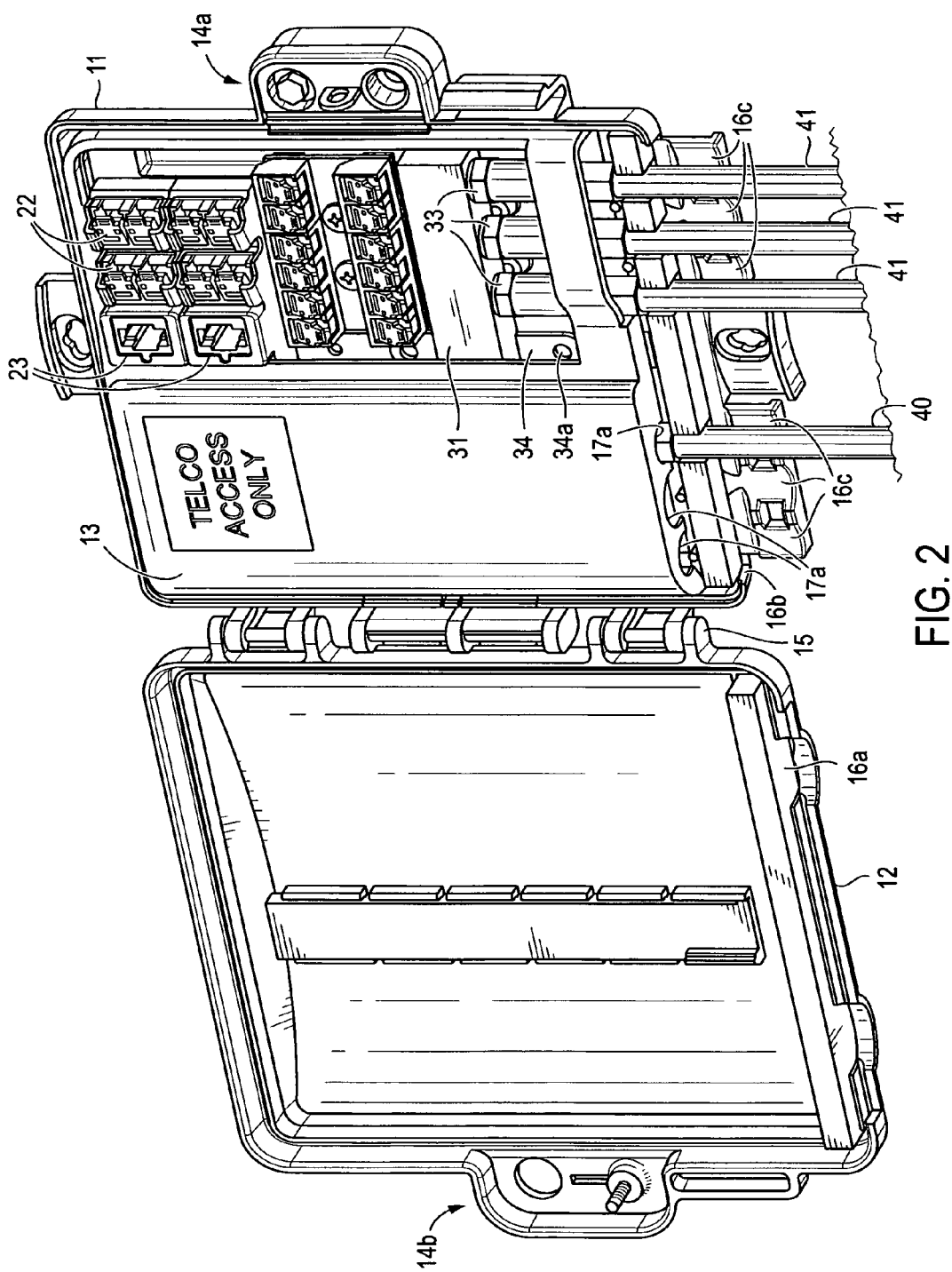
FIG. 2 is a perspective view of the device shown in FIG. 1 with the cover preventing access to the provider side of the device in the closed position.

FIG. 2 shows the device of FIG. 1 with second cover 13 in the closed and locked position. In this position, cables 40 and 41 are sandwiched between gasket portions 16a and 16b. Note that second cover 13 prevents access to telephone terminals 21 and coaxial cable connector 32. However, the device permits access to telephone terminals 22 and coaxial cable connectors 33. In this manner, the subscriber can open first cover 12 and have access to terminals 22 and connectors 33 but will not have access to terminals 21 and connector 32. Any of a number of known locking or latching mechanisms may be utilized to secure second cover 13. Alternatively, various devices, such as locking straps that must be cut to be removed, may be utilized to secure second cover 13. With such devices, it will be readily apparent to the telephone service provider if another party has opened second cover 13. First cover 12 can be closed and latched in the conventional manner. A typical latching mechanism is a screw or other threaded device that will secure first cover 12 in a closed position but permit easy access to the interior of first housing portion 11.

Although the present invention has been shown and described in detail, the same is to be taken by way of example only and not considered a limitation on the invention. Numerous changes to the embodiment described will be apparent to those of skill in the art. For example, it is not necessary that axes 32a and 33a lie in the same plane. The connectors could be staggered to increase the density of the connectors. Accordingly, the scope of the invention is to be limited only by the terms of the claims appended hereto.

The invention claimed is:

1. A telephone and cable television network interface device, including:
    a first housing having a first compartment and a second compartment;
    a first terminal, located in the first compartment, for connection to telephone service;
    a second terminal, located in the second compartment, for connection to a telephone of a telephone service subscriber;
    a cover for restricting access to the first compartment by the telephone service subscriber;
    a cable television splitter located in the first housing, the splitter including a second housing spanning the first and second compartments; and
    a plurality of coaxial cable connectors located in the second housing, at least one of the coaxial cable connectors being located in the first compartment and at least one of the coaxial cable connectors being located in the second compartment, wherein at least one of the coaxial cable connectors in the first compartment and at least one of the coaxial cable connectors in the second compartment face the same direction.

2. A device according to claim 1, wherein only one coaxial cable connector is located in the first compartment and at least two coaxial cable connectors are located in the second compartment.

3. A device according to claim 1, further including a plurality of grooves in the first housing and wherein each of the coaxial cable connectors is aligned with one of the grooves.

4. A device according to claim 1, wherein the longitudinal axis of each of the coaxial cable connectors is located in the same plane.

5. A device according to claim 1, further including a ground bus located in the first housing and wherein the cable television splitter includes a mounting tab securing the splitter to the ground bus.

6. The device according to claim 1 wherein the housing includes an opening and the longitudinal axes of the coaxial cable connectors are perpendicular to the plane defined by the opening.

7. A telephone and cable television network interface device, including:
    a first housing having a first compartment and a second compartment;
    a first terminal, located in the first compartment, for connection to telephone service;
    a second terminal, located in the second compartment, for connection to a telephone;
    a cover for restricting access to the first compartment;
    a cable television splitter located in the first housing, the splitter including a second housing having a first portion located in the first compartment and a second portion located in the second compartment;
    at least one coaxial cable connector located in the first portion of the second housing;
    a plurality of second coaxial cable connectors located in the second portion of the second housing; and
    wherein all of the coaxial cable connectors have a longitudinal axis and the longitudinal axes of all of the coaxial cable connectors are parallel.

8. A device according to claim 7, wherein the coaxial cable connectors face the same direction.

9. A device according to claim 7, further including a plurality of grooves in the first housing and wherein each of the coaxial cable connectors is aligned with one of the grooves.

10. A device according to claim 7, wherein the longitudinal axis of each of the coaxial cable connectors is located in the same plane.

11. A device according to claim 7, further including a ground bus located in the first housing and wherein the cable television splitter includes a mounting tab securing the splitter to the ground bus.

12. The device according to claim 7 wherein the housing includes an opening and the longitudinal axes of the coaxial cable connectors are perpendicular to the plane defined by the opening.

13. A telephone and cable television network interface device, including:
   a first housing having a first compartment and a second compartment;
   a first terminal located in the first compartment for connection to telephone service;
   a second terminal located in the second compartment for connection to a telephone;
   a cover for restricting access to the first compartment;
   an opening in the first housing, the opening defining a plane;
   a cable television splitter located in the first housing, the splitter having a second housing spanning the first and second compartments;
   at least one coaxial cable connector located in the second housing and in the first compartment;
   a plurality of second coaxial cable connectors located in the second housing and in the second compartment; and
   wherein at least one of the coaxial cable connectors located in the first compartment and at least one of the coaxial cable connectors located in the second compartment has a longitudinal axis perpendicular to the plane defined by the opening in the first housing.

14. A device according to claim 13, wherein the coaxial cable connectors face the same direction.

15. A device according to claim 13, wherein the longitudinal axis of each of the coaxial cable connectors is located in the same plane.

16. A device according to claim 13, further including a ground bus located in the first housing and wherein the cable television splitter includes a mounting tab securing the splitter to the ground bus.

17. A device according to claim 13, wherein the axes of each of the coaxial cable connectors are parallel.

* * * * *